March 18, 1947.  L. W. GACKI  2,417,482
FOCAL PLANE SHUTTER
Filed Feb. 2, 1945  2 Sheets-Sheet 1
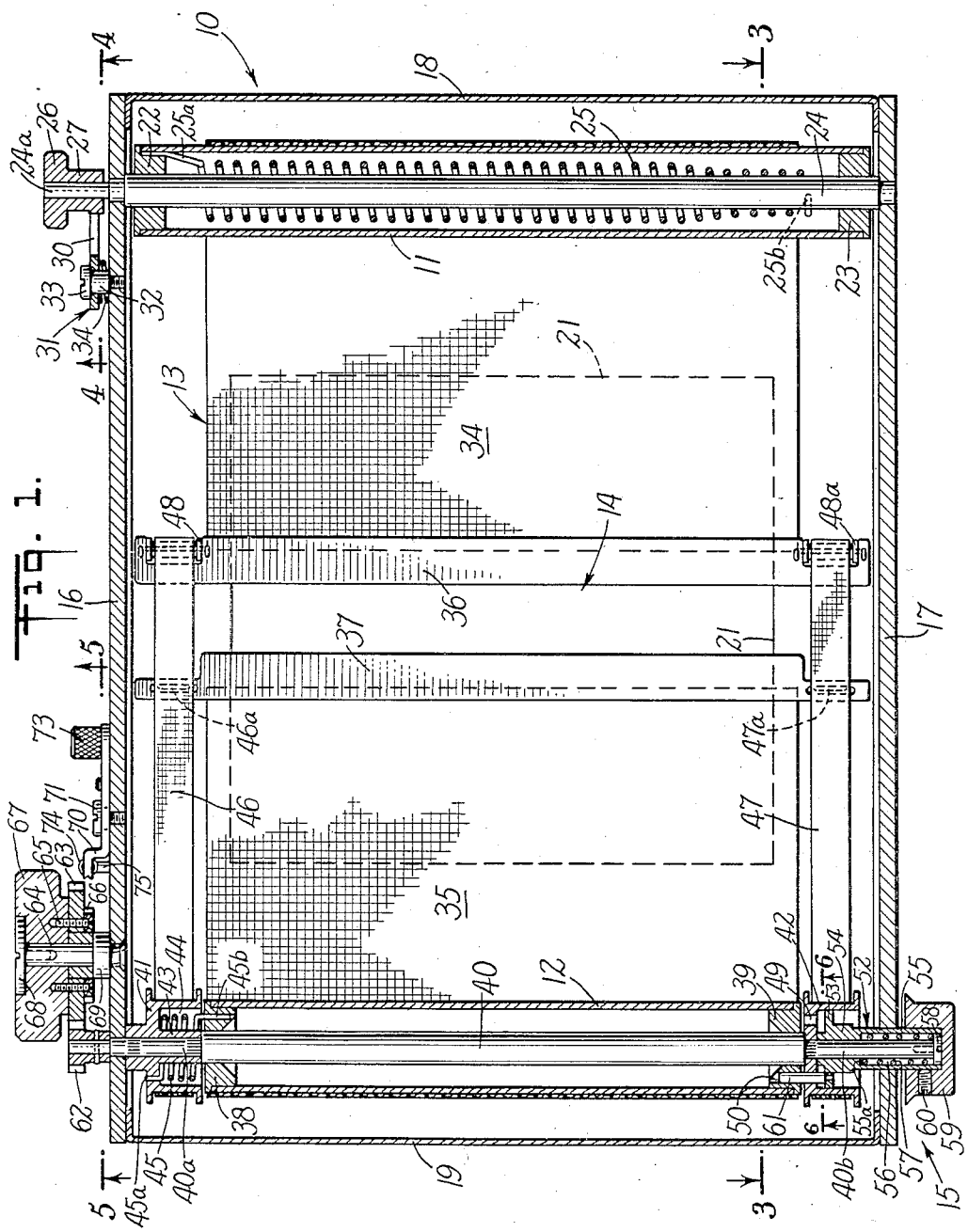
INVENTOR
Leonard W. Gacki
BY
Blair, Curtis & Hayward
ATTORNEYS

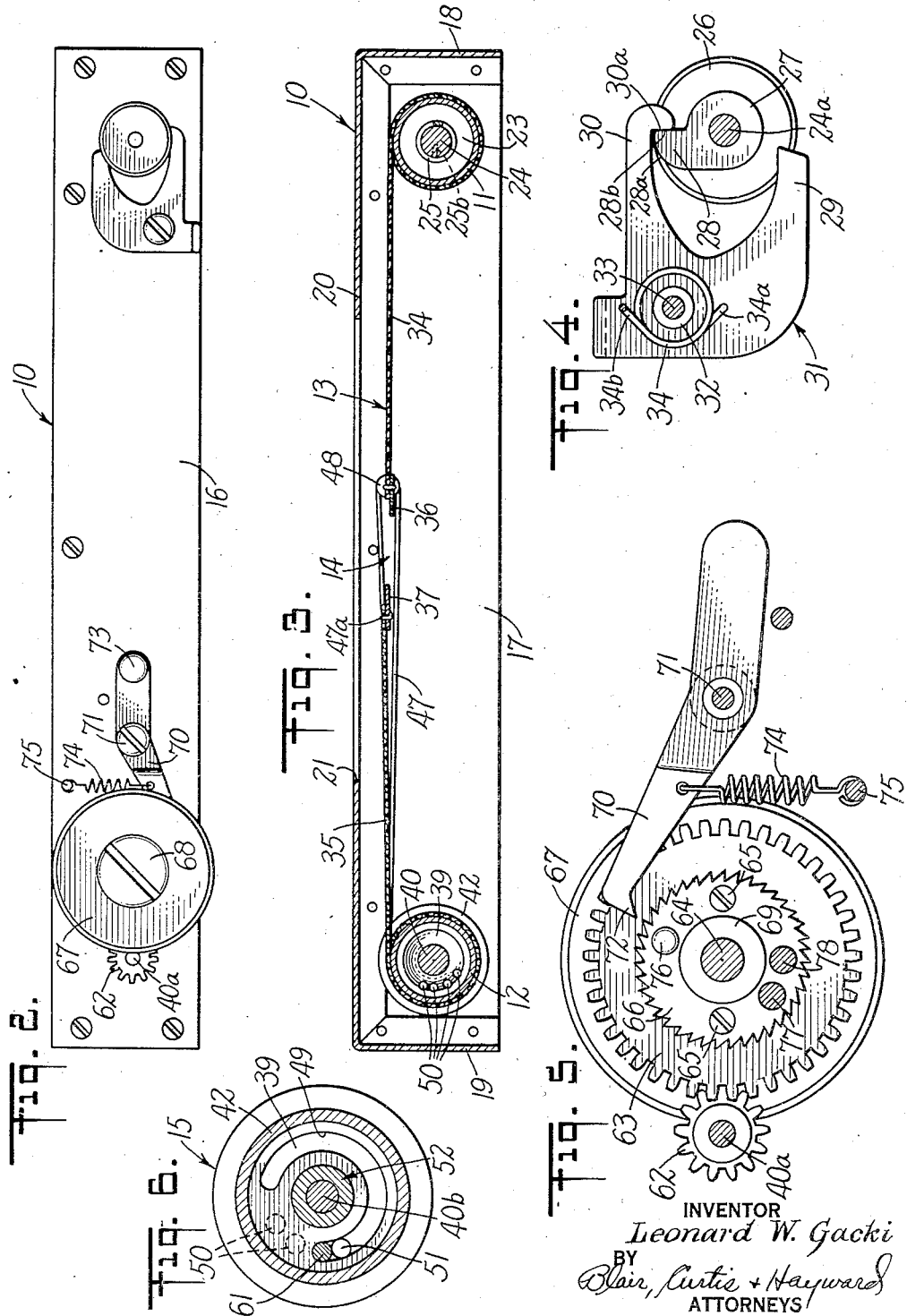

Patented Mar. 18, 1947

2,417,482

UNITED STATES PATENT OFFICE 2,417,482

FOCAL-PLANE SHUTTER

Leonard W. Gacki, Jamaica, N. Y., assignor to Fairchild Camera and Instrument Corporation, a corporation of Delaware Application February 2, 1945, Serial No. 575,786

5 Claims. (Cl. 95—57)

This invention relates to camera shutters and more particularly to an adjustable slit focal plane shutter.

Generally speaking, focal plane shutters may be divided into three broad types. One type is characterized by a shutter curtain which is provided with a plurality of slits of different widths, the curtain being selectively operable at different speeds to attain a range of shutter speeds by choosing among the slit widths and curtain speeds. A second type of focal plane shutter is characterized by a curtain having an adjustable slit whereby different exposure speeds may be attained through varying the width of the slit and the speed of the curtain. The third type is characterized by a curtain having a slit of fixed width, different exposure speeds being attained by varying the curtain speed.

Shutters of the first type have inherent disadvantages resulting from complexity of structure not only of the curtain with its many slits of different width, but also because of the necessity of providing mechanism for selecting the desired slit width. In most shutters of this first type the mechanism which selects the slit width is operated against the spring tension which drives the curtain so that the setting operation becomes rather difficult when the operating spring is at high tension.

The second type, i. e. the adjustable slit shutter, also has inherent disadvantages primarily arising through the difficulty of attaining the proper timing of travel of the leading and following curtains which form the slit. Also, in this type of shutter further difficulty arises by reason of non-uniform acceleration and deceleration of the leading and following curtains, with the result that the width of the slit varies as it moves across the focal plane, causing uneven exposure of the film.

In respect of the third type of focal plane shutter, i. e. the one characterized by a slit of fixed width, the range of exposure speeds is so narrow as to limit the usefulness of the shutter and hence its applicability to diverse usage and widely varying light conditions. It is accordingly among the objects of this invention to provide a focal plane shutter of simple, sturdy and inexpensive construction, capable of overcoming the several disadvantages mentioned hereinbefore, in addition to others. Other advantages will be apparent and in part pointed out hereinafter.

The invention accordingly consists in the features of construction, combinations of elements, and arrangements of parts, as will be exemplified in the structure to be hereinafter described and the scope of the application of which will be indicated in the following claims.

In the drawing wherein I have shown one embodiment of my invention,

Figure 1 is a horizontal section of my shutter showing the curtain halfway advanced across the aperture in the focal plane;

Figure 2 is an elevation of the left-hand side of the shutter shown in Figure 1;

Figure 3 is a sectional elevation taken along the line 3—3 of Figure 1;

Figure 4 is an enlarged section taken along the line 4—4 of Figure 1;

Figure 5 is an enlarged section taken along the line 5—5 of Figure 1; and

Figure 6 is an enlarged section taken along the line 6—6 of Figure 1.

Similar reference characters refer to similar parts throughout the several views of the drawing.

Referring first to Figure 1, the shutter and its operating mechanism are housed in a frame generally indicated at 10 and comprises a winding roll 11 and a rewind roll 12 on and by which the curtain generally indicated at 13 is wound prior to exposure operation. Curtain 13 is characterized by an adjustable slit generally indicated at 14, and the width of this slit may be selectively varied by the setting mechanism generally indicated at 15, all as will be described in greater detail hereinbelow.

Frame 10 includes a pair of side plates 16 and 17 connected at their opposite ends by end plates 18 and 19. Secured to side plates 16 and 17 is a back plate 20 (see also Figure 3) in which is formed an aperture 21 (Figure 1) across which slit 14 is swept upon operation of the shutter to expose the film (not shown). The film may either be a plate or a cut film, my shutter, however, being particularly well adapted for use with roll film as will be pointed out hereinbelow. Plate 20 and accordingly aperture 21 lies in or closely adjacent the focal plane when the shutter is installed in its operative position in the camera.

Winding roll 11 is preferably a lightweight tubular structure secured at its opposite ends to collars 22 and 23 which are in turn rotatably mounted on the opposite ends respectively of a shaft 24. Disposed within roll 11 and wound about shaft 24 is a torsion spring 25, one end 25a of which is suitably secured to collar 22 and accordingly winding roll 11, and the other end 25b of which is secured to shaft 24. It will thus appear that by rotating shaft 24 relative to winding roll 11, spring 25 may be tensioned or loaded, as desired.

The end 24a of shaft 24 is secured in a spring loading knob 26, this knob having a reduced hub 27 (Figure 4) on which is formed a lobe 28. Lobe 28 is provided with a cam surface 28a and an abutment surface or stop 28b which coact respectively with the arms 29 and 30 of an escapement generally indicated at 31. Escapement 31 is rockably mounted on the shank 32 (Figure 1) of a screw 33 threaded into side plate 16. Coiled about screw shank 32 is a spring 34, one end 34a of which is connected to escapement 31 (Figure 4) and the other end 34b of which (Figure 1) is connected to side plate 16 so that escapement 31 (Figure 4) is maintained in the position shown, wherein arm 30 is in the path of stop 28b of lobe 28. It may now be seen that when knob 26 is rotated to load spring 25, lobe 28 (Figure 4) also rotates. As the lobe rotates, its cam surface 28a engages escapement arm 29, forcing the escapement clockwise to permit passage of the lobe. If the operator thereafter looses his grasp on the loading knob 26 (Figure 1) permitting spring 25 to unwind, the spring cannot completely unwind, as stop 28b (Figure 4) will engage the top of escapement arm 29 which is returned to its stopping position by spring 34. As loading of the spring 25 proceeds, cam surface 28a of the load engages escapement arm 30, forcing the arm counterclockwise until the lobe passes into the position shown wherein the tendency of the lobe to rotate clockwise under the bias of the spring 25 has become restricted by the engagement of lobe stop 28b with the abutment 30a formed on escapement arm 30. Thus the tension of the shutter operating spring 25 may be set in small increments so that a wide range of spring tensions, and hence shutter speeds, may be selectively attained.

Curtain 13 comprises a leading curtain 34 and a trailing curtain 35. Curtain 34 has its right-hand end attached to winding roll 11 in any suitable manner, and on the left-hand edge is secured a rigid bar 36, the length of which exceeds the width of the curtain; thus the length of bar 36 equals substantially the distance of frame side plates 16 and 17 while curtain 34 is only slightly wider than aperture 21.

The left-hand end of trailing curtain 35 is secured to rewind roll 12, while to the right-hand edge of this curtain is secured a rail 37 somewhat similar to rail 36 in that its length exceeds the width of curtain 35, the curtain being slightly wider than aperture 21. Rails 36 and 37 when separated accordingly define slit 14 of curtain 13 and the width of this slit may be varied between limits as will be described hereinbelow.

Rewind roll 12 comprises a hollow tube, the opposite ends of which are secured to collars 38 and 39 respectively, and these collars are rotatably mounted on a shaft 40. The opposite ends 40a and 40b of shaft 40 are reduced and have fastened respectively thereto hollow ribbon drums 41 and 42. Drum 41 includes a hub 43 which with the periphery of the drum forms an annular space 44 within which a torsion spring 45 is coiled about the hub. One end 45a of this spring is secured to drum 41, and the other end 45b thereof is fastened to rewind roll collar 38, this spring being provided for a purpose which will be described hereinbelow. The left-hand end of a ribbon 46 is attached to drum 41, and this ribbon is disposed within frame 10 between side plate 16 and trailing curtain 35. Ribbon 46 is trained about a small roller 48 rotatably mounted in the upper end of curtain bar 36 and its end 46a is securely fastened to the upper end of trailing curtain bar 37.

Lower ribbon drum 42 has secured thereto the left-hand end (as viewed in Figure 1) of a ribbon 47, this ribbon being trained over a small roller 48a rotatably mounted on the lower end of leading curtain bar 36; the end 47a of this ribbon is securely fastened to the lower end of the trailing curtain bar 37. It will thus appear that the slit defining edges of the leading and trailing curtains are adjustably secured together and the width of slit 14 may be determined, as will be described, by the extent to which ribbons 46 and 47 are unwound from their respective drums 41 and 42.

As will more clearly appear hereinbelow, shutter curtain 13 and accordingly slit 14 (Figure 1) sweep across aperture 21 from left to right during exposure operation. In order that slit 14 may be maintained at a uniform width as it sweeps across aperture 21, it is desirable that the width of the slit be selectively predetermined prior to shutter operation; that the acceleration and deceleration of the slit defining edges be uniform; that the slit defining edges, i. e. bars 36 and 37 recap one another or overlap at the end of the exposure operation; and that the bars 36 and 37 remain recapped during the rewind operation, i. e. when shutter 13 travels from right to left (as viewed in Figure 1). These features are particularly desirable when roll film is being used, as they make possible much more rapid operation of the camera, uniform exposure of the film, and preclude fogging of the film.

To attain these ends, ribbon drum 42 is provided with an arcuate slot 49 (Figure 6), and collar 39 of rewind roll 12 (Figure 1) has a number of holes 50 drilled therein (see also Figures 3 and 6). The centers of these holes lie along the circumference of a circle the radius of which is equal to that of a circle whose circumference coincides with the center line of slot 49 so that the holes and slot 49 are in registry for purpose to be described. Collar 39 also has secured thereto and extending therefrom into slot 49 a pin 51 (Figure 6) which accordingly limits the amount of relative movement possible between the collar and drum 42 to the arcuate length of slot 49. Thus relative movement between rewind roll 12 and ribbon drums 41 and 42 under the bias of spring 45 (Figure 1) is equally limited. It is by reason of the provision of this limited relative movement between the rewind roll and the ribbon drums that slit 14 may be selectively adjusted, the desired width being predetermined by mechanism to be described.

Mounted on end 40b of shaft 40 (Figure 1) is a sleeve generally indicated at 52. This sleeve includes a flange 53 disposed within drum 42, a reduced hub 54 which has a sliding fit on shaft end 40b, and a shell 55 hollowed out to a diameter in excess of that of shaft end 40b to provide an annular space 56 within which a spring 57 is coiled about the shaft. The upper end of this spring (as viewed in Figure 1) bears against an interior shoulder 55a formed by the shell 55 and hub 54 of sleeve 52, and the lower end bears against the head of a screw 58 threaded into the lower end of shaft end 40b. A knurled knob 59 is secured to the free end of shell 55 as by a set screw 60 for the purpose of manipulating the sleeve. It will now appear that sleeve 52 may be slid axially of shaft end 40b against the bias of spring 57 which tends to hold the sleeve in the position shown, and the sleeve may also be rotated about the shaft end 40b.

Sleeve flange 53 has secured thereto a pin 61 (see also Figure 6) which extends through slot 49 in drum 42 and selectively into any one of holes 50 in roll drum 39. The width of slit 14 is determined by that one of holes 50 into which pin 61 is set. Thus sleeve 52 may be drawn away from roll collar 39 until pin 61 clears the collar. Thereafter the sleeve may be rotated in one direction or another and pin 61 set into that one of holes 50 selected in accordance with the slit width desired. The manner in which the setting of pin 61 predetermines the width of slit 14 will be described hereinbelow.

The upper end 40a of shaft 40 (Figure 1) extends through and is journaled in frame side plate 16 and has secured thereto a small pinion 62. This pinion meshes with a gear 63 rotatably mounted on a stud 64, the lower end of which is fastened to side plate 16. On opposite sides of gear 63 are respectively secured, as by screws 65, a ratchet 66 and a rewind knob 67, these three parts being held in operative position on stud 64 by the head of a screw 68 the shank of which is threaded into the free end of the stud. A spacer 69 is provided between ratchet 66 and side plate 16 to hold gear 63 in mesh with pinion 62.

As is more clearly shown in Figure 5, ratchet 66 coacts with a pawl 70 pivotably mounted on the unthreaded portion of a screw 71 (see Figure 1) threaded into side plate 16. One end of pawl 70 is, of course, provided with a detent 72 which coacts with ratchet 66, and the other end of the pawl (Figure 2) carries a knob 73 by which the pawl may be manipulated. A spring 74 has one end attached to the pawl and the other end to a pin 75 fastened to side plate 16, and this spring constantly biases the pawl into ratcheting engagement with the ratchet. Thus it will appear that when pawl 70 is pivoted clockwise (as viewed in Figure 5) to free detent 72 from ratchet 66, shaft 40 (Figure 1) and accordingly shutter 13 are released for exposure operation by the spring driven winding roll 11.

In order to limit the exposure and rewind travel of shutter 13 across aperture 21, ratchet 66 (Figure 5) has secured thereto a pin 76 which travels with the ratchet during its clockwise and counterclockwise movement. Counterclockwise movement of the ratchet is limited by the abutment of pin 76 with a fixed pin 77 secured to side plate 16 (Figure 1) and clockwise movement of the ratchet is limited by the abutment of its pin 76 (Figure 5) with another fixed pin 78 secured to side plate 16. Clockwise movement of ratchet 66 occurs while the curtain 13 (Figure 3) is being rewound, and of course the ratchet rotates counterclockwise during exposure operation of the curtain when the curtain is being wound on winding roll 11.

In the following description of the operation of the above structure, when reference is made to the setting position of shutter 13 (Figure 1), the midway position of the shutter, and the final position of the shutter, it will be understood that when in the setting position, curtain bars 36 and 37 are capped, i. e. they overlie one another at the left-hand portion of frame 10 adjacent rewind roll 12, that when in the midway position the curtain bars are spaced to define slit 14 as shown in Figure 1, and that when in the final position, the curtain bars are capped and lie in the right-hand portion of frame 10 adjacent winding roll 11. In this connection, the setting position of the curtain bars is determined by the engagement of pin 76 (Figure 5) and pin 78. Engagement of pin 76 with pin 77, on the other hand, determines the final position.

Prior to the exposure operation of the shutter, curtain bars 36 and 37 overlie or cap one another in the setting position. To select the slit width desired, knob 59 is pulled outwardly of frame 10 to withdraw pin 61 from roll collar 39. Thereafter the knob is rotated until pin 61 can be reinserted in collar 39 into the selected hole. When the curtain is in the setting position, operating spring 25 is under tension so that release operation of pawl 70 by knob 73 releases the pawl detent from ratchet 66. Thence, spring 25, acting through roll 11, shutter 13 and ribbon drums 41 and 42, rotates shaft 40 and accordingly gears 62 and 63. During the initial part of this operation, curtain 34 and accordingly bar 36 start their movement from the setting position to the right. However, curtain 35 and bar 37 do not partake of this initial movement being held in the setting position due to the bias of spring 45 which at all times biases rewind roll 12 in such a direction as to tend to pull curtains 35 to the left. Accordingly, during the initial movement of curtain 34 and bar 36, ribbons 46 and 47 are unwound from their respective drums 41 and 42. Drum 42 continues to rotate relative to rewind roll collar 39 until pin 61 is engaged by the end of slot 49. Upon this engagement drum 42 and collar 39 are in effect locked together so that continued rotation of the drum rotates roll 12, permitting curtain 35 to unwind therefrom at the same rate at which the ribbons are being unwound from their drums. Thus it follows that slit 14 is formed and is maintained at a constant width during the travel of curtain 13 from its setting to its final position as bar 36 is the only thing that is drawing bar 37 and accordingly curtain 35 over aperture 21. In other words, curtain 37 has no independent relationship to curtain 34 but depends on the movement of curtain 34 for its movement. Before, curtain 13, or rather before bar 36, attains the final position, pin 76 (Figure 5) engages stop pin 77 which, acting through the train of gears 63 and 62 and shaft 40, stops rotation of drums 41 and 42. However, bar 36 continues to move to its final position, and in so doing, pulls against the bights in ribbons 46 and 47 to shorten the overlying ends thereof attached to bar 37 and hence draw bar 37 toward bar 36 until the two bars are capped.

When it is desired to rewind curtain 13 from the final position to the setting position, knob 67 is rotated clockwise (as shown in Figure 5) until pin 76 engages pin 78. During this rewind operation, curtain bars 36 and 37 remain capped as the ribbons 46 and 47, while being rewound on their drums 41 and 42 respectively, constantly force the bars together while at the same time drawing them to the left.

It may accordingly be seen that the width of slit 14 may be selected or varied at any position of curtain 13 with no tension on the setting knob 59. It also follows that inasmuch as curtain 35 is driven solely by curtain 34, it must of necessity follow curtain 34 at a uniform rate and hence both the leading and following curtains accelerate and decelerate at the same rate to form a slit of uniform width. Still further, when the curtain attains its final position, the slit dividing bars 36 and 37 automatically becomes capped, or rather recapped, and remains so during the rewind operation, thus greatly facilitating the use of the shutter with roll film.

Accordingly, I have provided a shutter which attains the several objects set forth hereinabove in a thoroughly practical and efficient manner.

As many possible embodiments may be made of the above invention, and as many changes might be made in the embodiment above set forth, it is to be understood that all matter hereinbefore set forth, or shown in the accompanying drawing, is to be interpreted as illustrative and not in a limiting sense.

I claim:

1. A focal plane shutter, in combination, a casing, a pair of spaced shafts rotatably mounted in said casing, a tension roller mounted on one of said shafts, a rewind roller rotatably mounted on the other of said shafts, means limiting the relative movement between said rewind roller and its shaft, a pair of ribbon drums secured to said rewind roller shaft, a leading curtain connected to said tension roller, a following curtain connected to said rewind roller between said ribbon drums, a pair of ribbons, each of said ribbons having one end connected to one of said drums and its other end connected to said following curtain, means connecting each of said ribbons to said leading curtain for both movement therewith and movement relative thereto, means for spacing the adjacent edges of said curtain to form an exposure slit adapted to be swept across an aperture between said rollers upon exposure operation of said shutter, means biasing said rewind roller oppositely to the direction of rotation of said ribbon drums during exposure operation thereof, and means effective after the free edge of said leading curtain has passed beyond said aperture for holding said tape drums against further movement, whereby continued movement of said leading curtain free edge causes relative movement between said leading curtain and said ribbons, causing the adjacent edges of said curtain to be drawn together in capped relationship.

2. A focal plane shutter, in combination, a casing, a pair of spaced shafts rotatably mounted in said casing, a tension roller mounted on one of said shafts, a rewind roller rotatably mounted on the other of said shafts, means limiting the relative movement between said rewind roller and its shaft, a pair of ribbon drums secured to said rewind roller shaft, a leading curtain connected to said tension roller, a following curtain connected to said rewind roller between said ribbon drums, a pair of ribbons, each of said ribbons having one end connected to one of said drums and its other end connected to said following curtain, means connecting each of said ribbons to said leading curtain for both movement therewith and movement relative thereto, means for spacing the adjacent edges of said curtain to form an exposure slit adapted to be swept across an aperture between said rollers upon exposure operation of said shutter, means biasing said rewind roller oppositely to the direction of rotation of said ribbon drums during exposure operation thereof, and means for effecting relative movement between said adjacent edges after said edges have passed over said aperture to cause said edges to overlie one another thereby to recap said shutter.

3. A focal plane shutter, in combination, a casing, a pair of spaced shafts rotatably mounted in said casing, a tension roller mounted on one of said shafts, a rewind roller rotatably mounted on the other of said shafts, means limiting the relative movement between said rewind roller and its shaft, a pair of ribbon drums secured to said rewind roller shaft, a leading curtain connected to said tension roller, a following curtain connected to said rewind roller between said ribbon drums, a pair of ribbons, each of said ribbons having one end connected to one of said drums and its other end connected to said following curtain, means connecting each of said ribbons to said leading curtain for both movement therewith and movement relative thereto, means for spacing the adjacent edges of said curtain to form an exposure slit adapted to be swept across an aperture between said rollers upon exposure operation of said shutter, means biasing said rewind roller oppositely to the direction of rotation of said ribbon drums during exposure operation thereof, means for effecting relative movement between said adjacent edges after said edges have passed over said aperture to cause said edges to overlie one another thereby to recap said shutter, and means for maintaining said adjacent edges recapped as the shutter is rewound.

4. Apparatus according to claim 1 wherein the means which biases the rewind roller oppositely to the direction of rotation of the ribbon drums comprises a spring having one end attached to one of the ribbon drums and the other end attached to the rewind roller.

5. Apparatus according to claim 1 wherein the means which biases the rewind roller oppositely to the direction of rotation of the ribbon drums comprises a coiled spring disposed within one of said ribbon drums and having one end secured to said ribbon drum and its other end secured to said rewind roller.

LEONARD W. GACKI.

REFERENCES CITED

The following references are of record in the file of this patent:

UNITED STATES PATENTS

| Number | Name | Date |
|---|---|---|
| 842,251 | Sasse | Jan. 29, 1907 |
| 833,916 | Brauburger | Oct. 23, 1906 |
| 941,126 | Brauburger | Nov. 23, 1909 |
| 1,652,553 | Barnack | Dec. 13, 1927 |
| 720,659 | Borsum | Feb. 17, 1903 |
| 714,106 | Garfield | Nov. 18, 1902 |